US010298731B2

(12) United States Patent
Karnalkar et al.

(10) Patent No.: US 10,298,731 B2
(45) Date of Patent: *May 21, 2019

(54) METHOD AND APPARATUS FOR MANAGING COMMUNICATIONS

(71) Applicant: Uber Technologies, Inc., San Francisco, CA (US)

(72) Inventors: Anup D. Karnalkar, Allen, TX (US); R. Tyler Wallis, Greenwood Village, CO (US); William Stanley Robbins, Sun Prairie, WI (US); Susan Steele, Phillipsburg, GA (US); Larry B. Pearson, San Antonio, TX (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,395

(22) Filed: May 7, 2018

(65) Prior Publication Data
US 2018/0255164 A1    Sep. 6, 2018

Related U.S. Application Data

(63) Continuation of application No. 14/959,483, filed on Dec. 4, 2015, now Pat. No. 9,967,383, which is a
(Continued)

(51) Int. Cl.
*H04M 1/2745* (2006.01)
*H04W 4/02* (2018.01)
(Continued)

(52) U.S. Cl.
CPC ...... *H04M 1/27455* (2013.01); *G06Q 10/107* (2013.01); *H04M 1/72583* (2013.01);
(Continued)

(58) Field of Classification Search
CPC ......... H04M 1/27455; H04M 1/72583; H04M 3/42365; H04M 3/42059; H04M 2250/08;
(Continued)

(56) References Cited

U.S. PATENT DOCUMENTS 5,848,356 A    12/1998  Jambhekar et al.
5,907,604 A     5/1999  Hsu
(Continued)

FOREIGN PATENT DOCUMENTS

EP       1505814 A2     2/2005
GB       2433375 A      6/2007
WO    WO 2005/050954 A2   6/2005

OTHER PUBLICATIONS

United States Office Action, U.S. Appl. No. 14/060,030, dated Feb. 27, 2015, 16 pages.
(Continued)

*Primary Examiner* — George Eng
*Assistant Examiner* — Hung K Du
(74) *Attorney, Agent, or Firm* — Fenwick & West LLP

(57) ABSTRACT

A system that incorporates teachings of the present disclosure may include, for example, a communication device having a controller to detect a selection of an image from a graphical user interface, identify an entry in a contact book responsive to the detected selection of the image, and retrieve one or more communication identifiers associated with the party from the entry of the contact book for initiating a communication session. Other embodiments are disclosed.

19 Claims, 8 Drawing Sheets

Related U.S. Application Data continuation of application No. 14/060,030, filed on Oct. 22, 2013, now Pat. No. 9,237,221, which is a continuation of application No. 12/329,513, filed on Dec. 5, 2008, now Pat. No. 8,594,739.

(51) Int. Cl.
| | | |
|---|---|---|
| *H04M 3/42* | (2006.01) | |
| *H04M 1/725* | (2006.01) | |
| *H04W 4/16* | (2009.01) | |
| *G06Q 10/10* | (2012.01) | |

(52) U.S. Cl.
CPC ... *H04M 3/42059* (2013.01); *H04M 3/42365* (2013.01); *H04W 4/02* (2013.01); *H04W 4/16* (2013.01); *H04M 2250/08* (2013.01)

(58) Field of Classification Search
CPC .......... H04W 4/02; H04W 4/16; H04L 67/14; H04L 67/24; H04L 67/306; H04L 67/36; H04L 51/00; H04L 51/36; H04L 51/066; G06Q 10/107
See application file for complete search history.

(56) References Cited

U.S. PATENT DOCUMENTS

| | | | |
|---|---|---|---|
| 8,181,218 B2 | 5/2012 | Asmussen | |
| 8,594,739 B2* | 11/2013 | Karnalkar | G06Q 10/107 |
| | | | 455/566 |
| 9,237,221 B2* | 1/2016 | Karnalkar | G06Q 10/107 |
| 9,967,383 B2* | 5/2018 | Karnalkar | G06Q 10/107 |
| 2001/0050977 A1 | 12/2001 | Gerszber et al. | |
| 2003/0153337 A1 | 8/2003 | Ito | |
| 2004/0209640 A1 | 10/2004 | Urban et al. | |
| 2007/0032267 A1 | 2/2007 | Haitani et al. | |
| 2007/0036313 A1 | 2/2007 | White et al. | |
| 2007/0112939 A1 | 5/2007 | Wilson et al. | |
| 2007/0133760 A1 | 6/2007 | Cotignola et al. | |
| 2007/0153991 A1 | 7/2007 | Daigle | |
| 2007/0296739 A1 | 12/2007 | Lonn | |
| 2008/0059627 A1 | 3/2008 | Hamalainen et al. | |
| 2008/0148154 A1 | 6/2008 | Burrell et al. | |
| 2008/0250066 A1 | 10/2008 | Ekstrand et al. | |
| 2008/0285729 A1 | 11/2008 | Glasgow et al. | |
| 2008/0294718 A1 | 11/2008 | Okano | |
| 2008/0309617 A1 | 12/2008 | Kong et al. | |
| 2009/0128502 A1 | 5/2009 | Li et al. | |
| 2009/0143052 A1 | 6/2009 | Bates et al. | |
| 2009/0274286 A1 | 11/2009 | O'Shaughnessy et al. | |
| 2010/0077302 A1 | 3/2010 | Bostrom et al. | |
| 2010/0088365 A1 | 4/2010 | Varney | |
| 2010/0099387 A1 | 4/2010 | So et al. | |
| 2010/0105437 A1 | 4/2010 | Lee et al. | |
| 2010/0162171 A1 | 6/2010 | Felt et al. | |

OTHER PUBLICATIONS

United States Office Action, U.S. Appl. No. 14/060,030, dated Jun. 16, 2014, 15 pages.
United States Office Action, U.S. Appl. No. 14/060,030, dated Nov. 26, 2013, 13 pages.
United States Office Action, U.S. Appl. No. 12/329,513, dated Apr. 15, 2013, 17 pages.
United States Office Action, U.S. Appl. No. 12/329,513, dated May 21, 2012, 35 pages.
United States Office Action, U.S. Appl. No. 14/959,483, dated Mar. 22, 2017, 17 pages.

* cited by examiner

Communication Devices

METHOD AND APPARATUS FOR MANAGING COMMUNICATIONS

CROSS-REFERENCE TO RELATED APPLICATIONS

This application is a continuation of U.S. application Ser. No. 14/959,483, filed Dec. 4, 2015, which is a continuation of U.S. application Ser. No. 14/060,030, filed Oct. 22, 2013 (now U.S. Pat. No. 9,237,221), which is a continuation of U.S. application Ser. No. 12/329,513, filed Dec. 5, 2008 (now U.S. Pat. No. 8,594,739), which are incorporated herein by reference in their entirety.

FIELD OF THE DISCLOSURE

The present disclosure relates generally to communication techniques and more specifically to a method and apparatus for managing communications.

BACKGROUND OF THE DISCLOSURE

It is common today for communication devices such as cordless and mobile phones to identify calling parties by a caller identification (ID) retrieved from signaling information in the call, or by picture ID. A picture ID can be presented when the caller ID matches an entry in a contact book having an association with a picture recorded by the subscriber to assist in identifying a calling party during an incoming call.

DETAILED DESCRIPTION OF THE DRAWINGS

One embodiment of the present disclosure can entail a communication device having a tablet with a touch-sensitive display. A base unit can be communicatively coupled to the tablet by way of a cordless phone protocol and a wireless data protocol to provide voice and data communication services to the tablet. The tablet can be adapted to store in an entry of a contact book one or more communication identifiers for establishing communications with a party, associate an image to the entry of the contact book corresponding to the party, present a toolbar with the image, detect a selection of the image, identify the entry in the contact book responsive to the detected selection of the image, retrieve the one or more communication identifiers of the party from the entry of the contact book, and when only one communication identifier is retrieved from the entry in the contact book corresponding to the party, invoke a communication session according to the retrieved communication identifier.

Another embodiment of the present disclosure can entail a communication device having a controller to detect a selection of an image from a graphical user interface, identify an entry in a contact book responsive to the detected selection of the image, and retrieve one or more communication identifiers associated with the party from the entry of the contact book for initiating a communication session.

Yet another embodiment of the present disclosure can entail a computer-readable storage medium having computer instructions to associate an image to an entry of a contact book having one or more communication identifiers of a party. The association can serve to initiate a communication session directed to the party when the image is selected.

Figure 1:
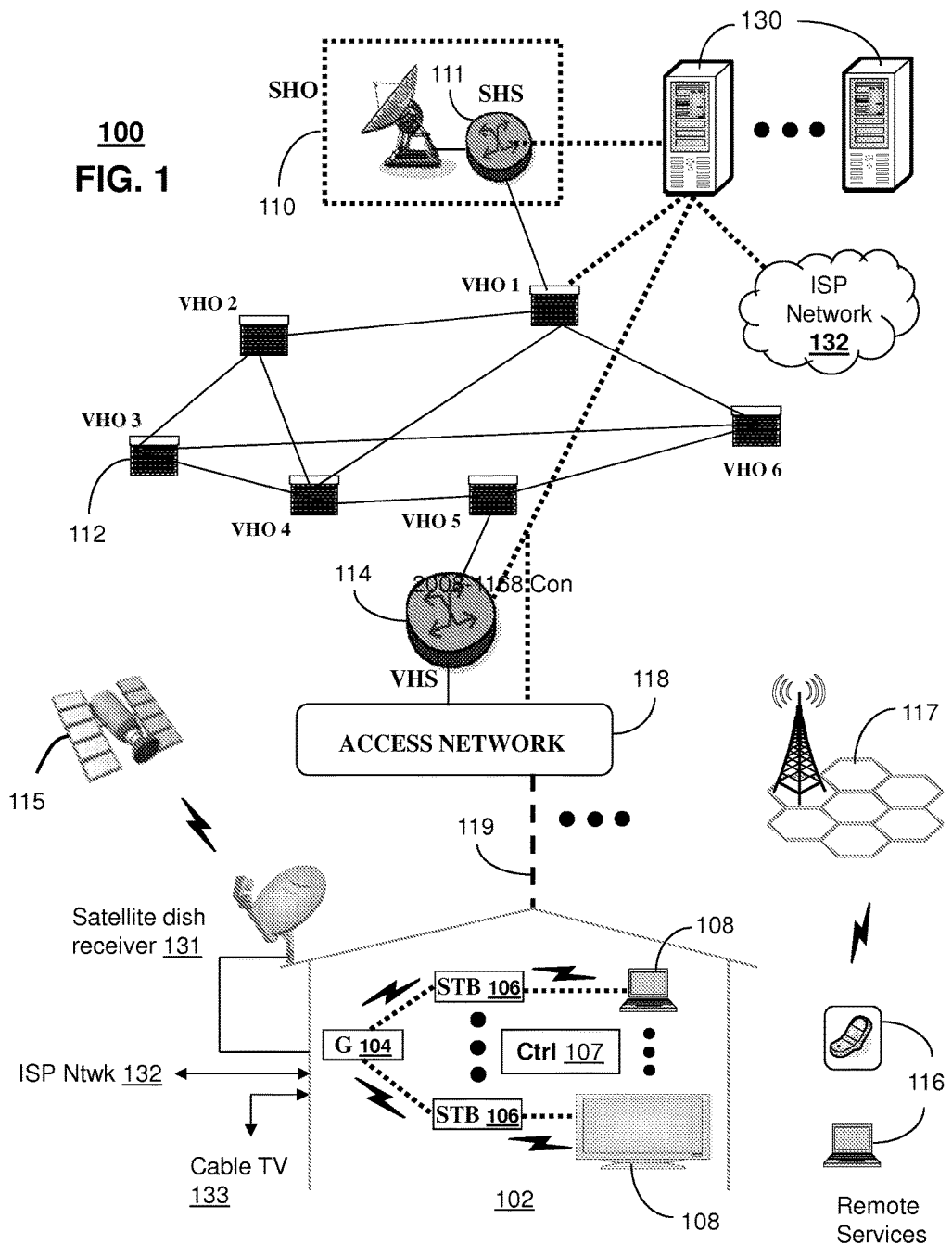
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the one or more computing devices 130 can be used as a presence system 130 (herein referred to as presence system 130) for collecting presence information associated with users of the first communication system 100. Presence information can indicate for example the whereabouts of users as well as the communication devices in use by these users. The whereabouts of a user can be determined from GPS coordinates transmitted by communication devices of the users to the presence system 130, or from triangulation analysis performed from data provided by base stations such as reference 117.

The presence system 130 can determine which communication devices are in use by a user by monitoring network activity generated thereby, or from status information provided by the communication devices. The presence system 130 can for example determine from network activity derived from common network elements such as switches or routers that a user is working from a computer terminal at his/her office, utilizing a cellular phone, office phone, home phone, or otherwise. The presence system 130 can make a similar determination by polling communication devices of the user to determine their state of usage.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
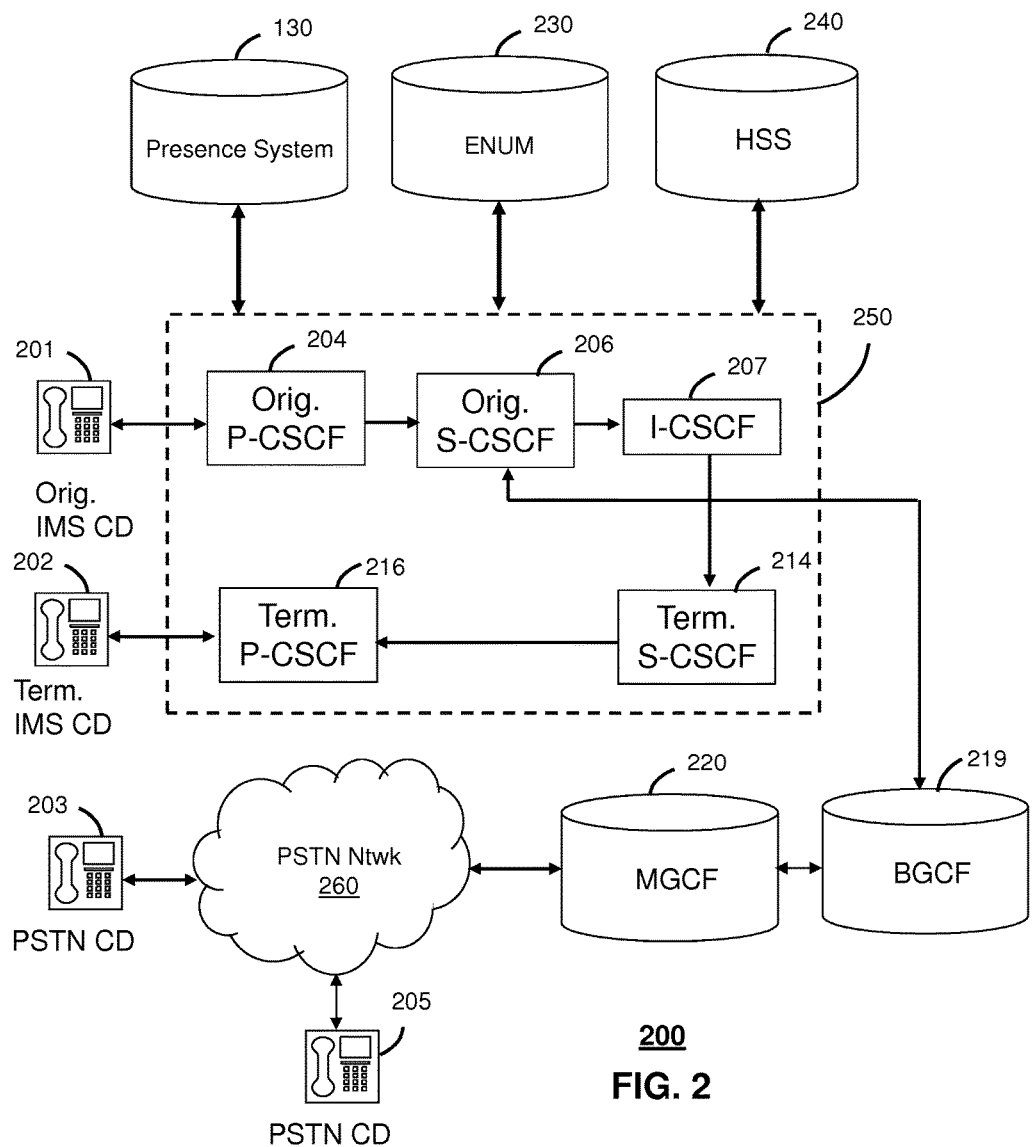

FIG. 2 depicts an illustrative embodiment of a communication system 200, employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The presence system 130 of FIG. 1 can be operably coupled to the second communication system 200 for purposes similar to those described above.

Figure 3:
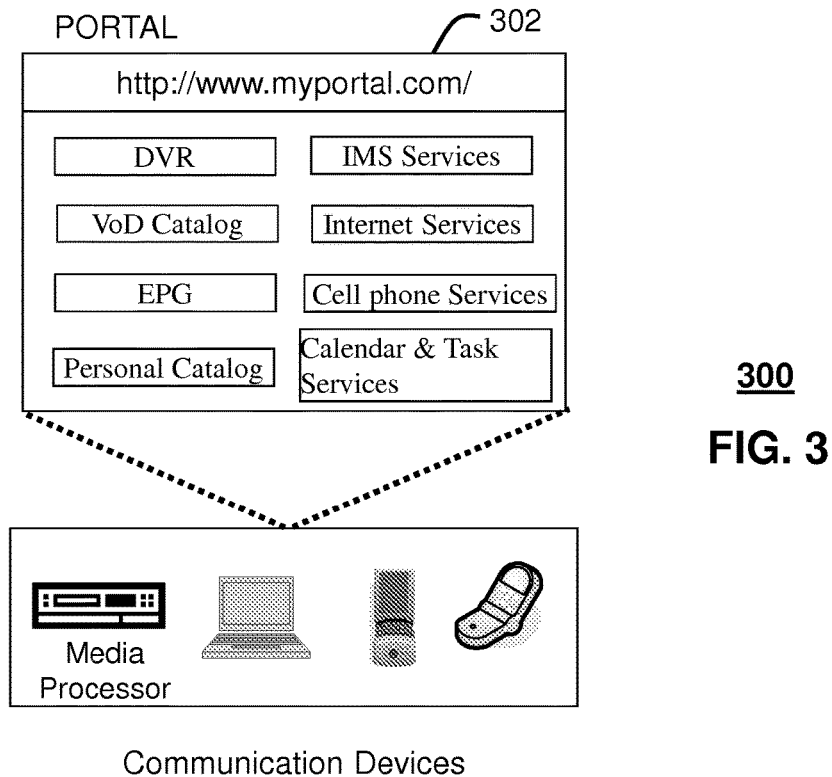
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, provisioning calendar and task services, and so on.

Figure 4:
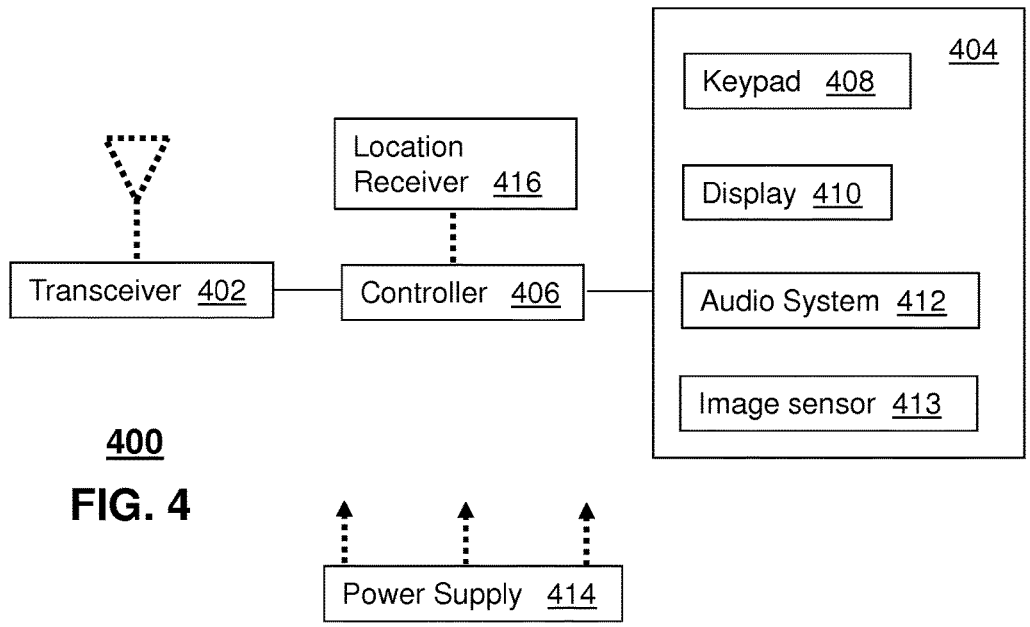
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
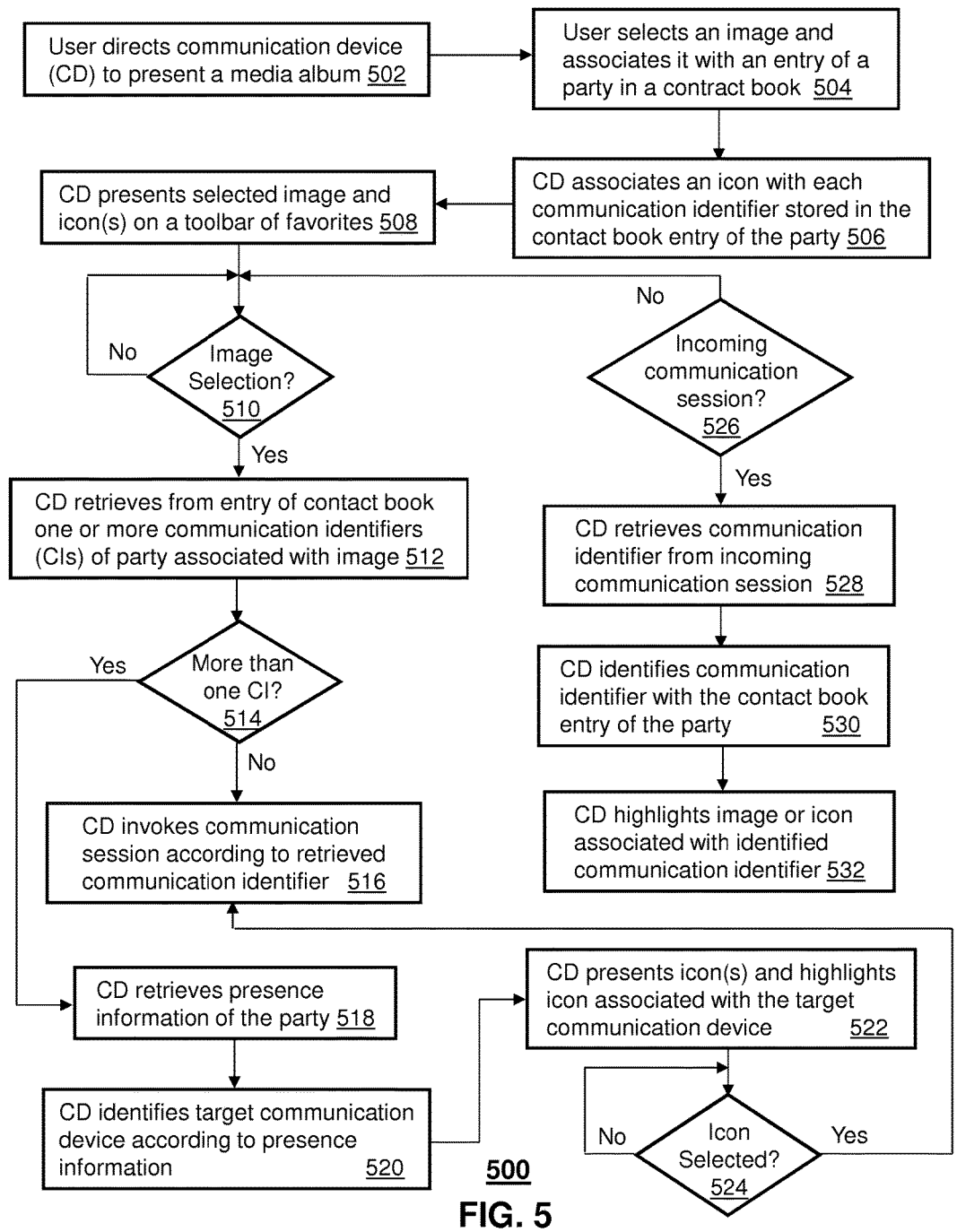
FIG. 5 depicts an illustrative embodiment of a method according to the present disclosure.
Figure 6:
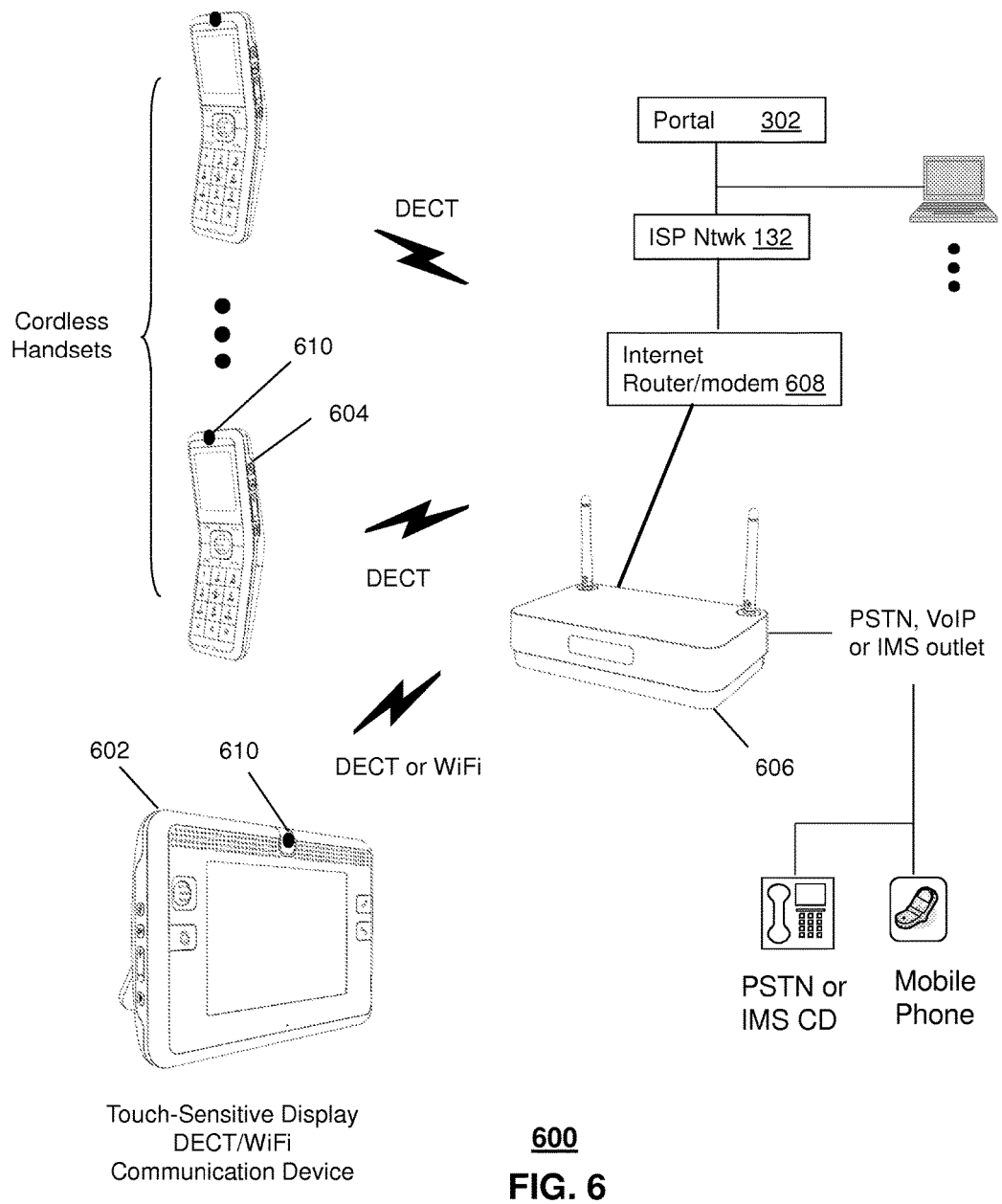
FIGS. 6-8 depict illustrative embodiments of the method of FIG. 5.

FIG. 5 depicts an illustrative method 500 for managing tasks. FIG. 6 shows an illustrative embodiment of a block diagram 600 of communication devices operating according to method 500. Block diagram 600 comprises a communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can be coupled to an Internet/router modem 608 for communicatively interfacing to the portal 302, a computer 116 or other communication devices accessible by way of the ISP network 132 of FIG. 1. The base unit 606 can provide the cordless handsets voice communication services, and the tablet 602 a combination of voice and data communication services. The tablet 602 and cordless handsets 604 can be equipped with common camera sensors 610 (such as CCD sensors) which can enable these devices to support video communication services and capture still images or pictures.

Figure 7:
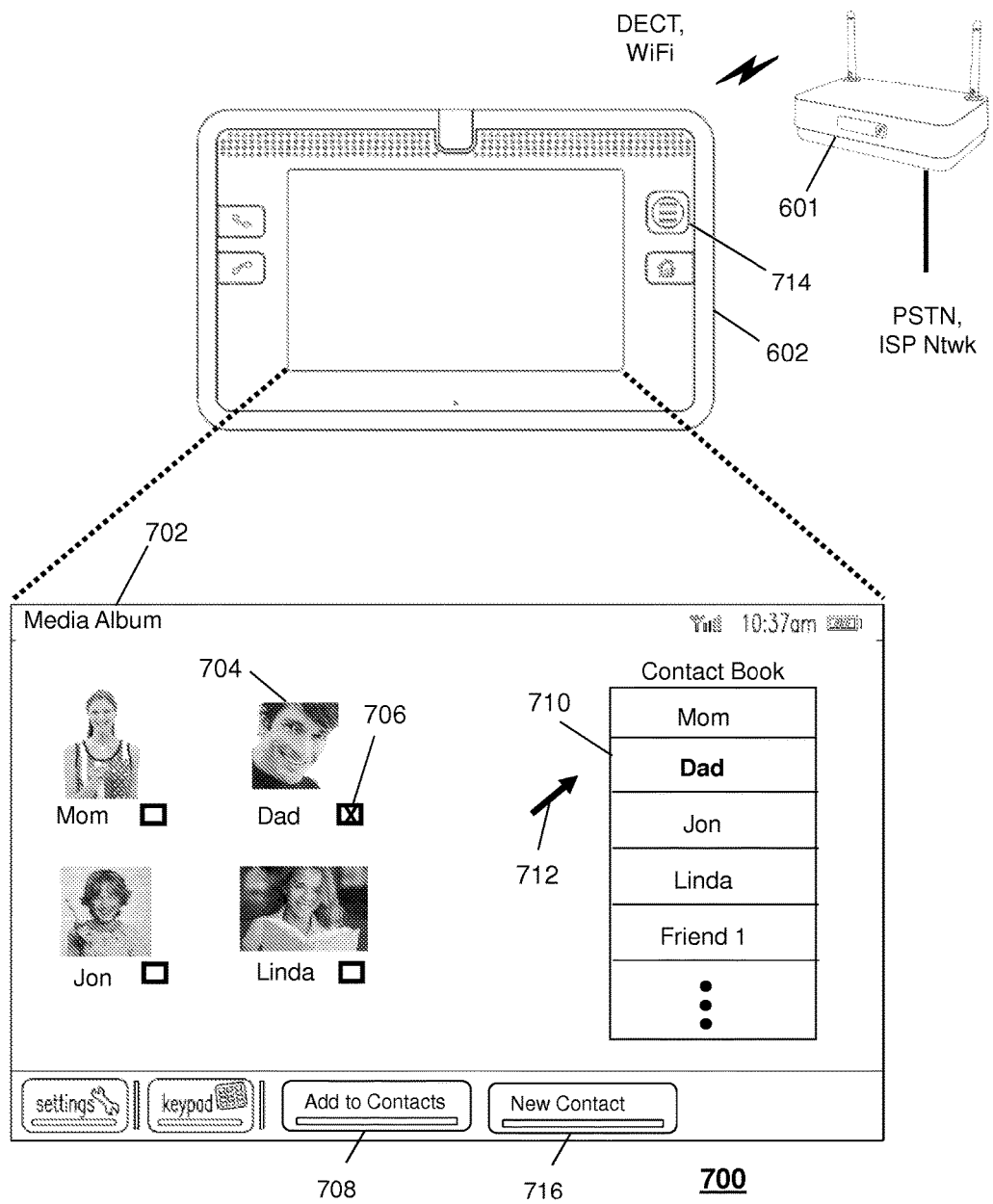

With the configuration of FIG. 6 in mind, method 500 can begin with step 502 in which a user directs a communication device such as the tablet 602 to present a media album 702 as shown in FIG. 7. The media album can comprise of common media files such as pictures and video. The media album can be created from still or moving images captured by the camera 610 of the tablet 602, or from media content supplied by the user to the tablet 602 over the WiFi air interface or a physical port of the tablet (such as a USB port) from any source. Each of the images presented in the media album can be accompanied by a selectable checkbox 706 to signal a desire to use one or more of the images for an association with a contact book operating in the tablet 602.

In step 504, a user can for example select the checkbox 706 for the image 704 (which could be a picture or video) and depress the button "Add to Contacts" 706. This selection can cause the tablet 602 to present the user a list of contact book entries 710 for associating to the selected image 704. The user can associate image 704 by selecting an entry in the contact book using a navigation pointer 712. By placing the pointer 712 over "Dad", and double-clicking the navigation device 714, the tablet 602 can proceed to record an association with the entry. The association can be recorded as a common pointer stored in the memory of the tablet 602. If a desired contact book entry is not present, the user can select the "New Contact" button to enter a new party using a common procedure for creating contact book entries (e.g., GUI for entering party's name, home and office address, contact numbers for home, office, mobile, email address, instant messaging address, SIP URI, and so on).

Figure 8:
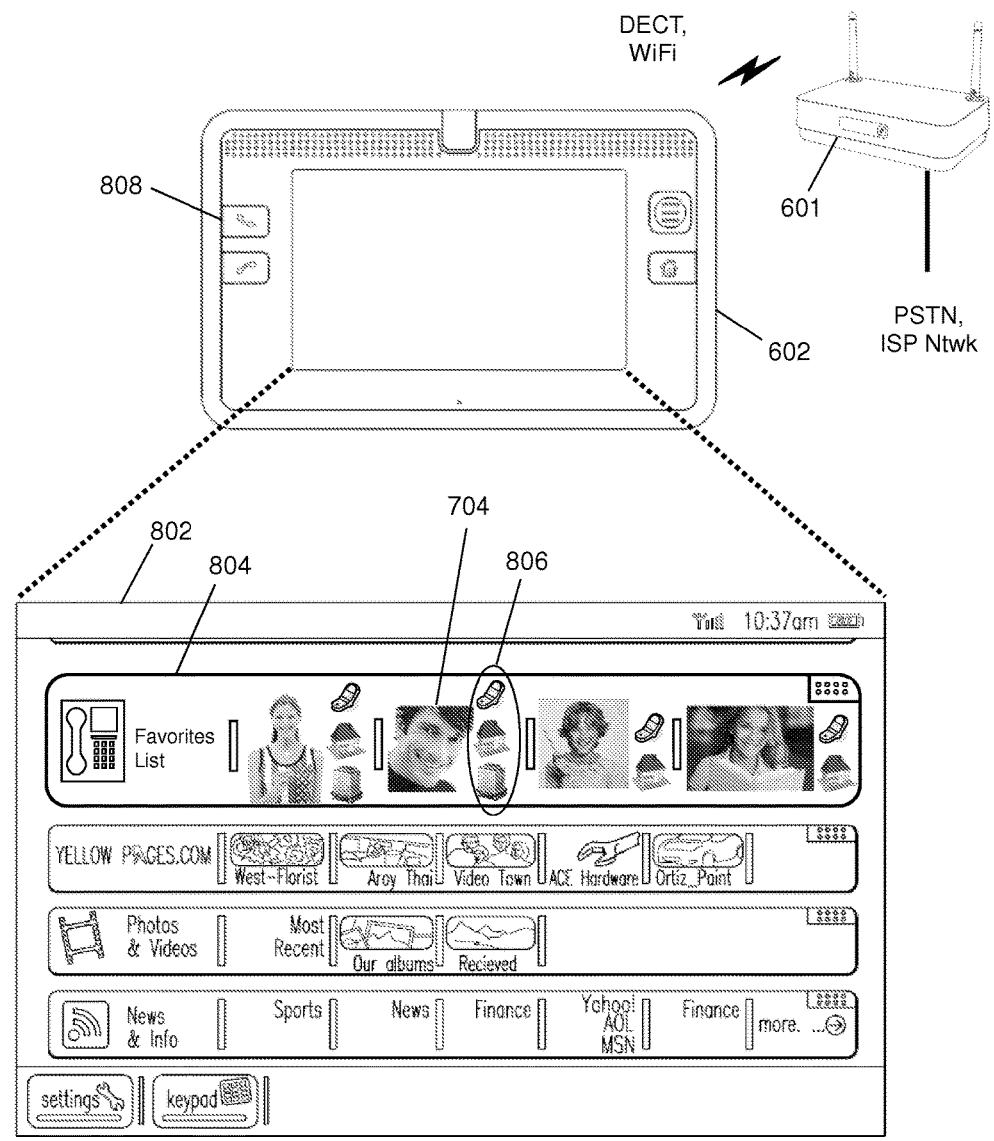

In step 506, the tablet 602 can be programmed to associate an icon with each communication identifier stored in the contact book entry of the party in question according to a communication identifier type. For instance each field of a particular the contact book entry (e.g., Dad's contact book entry) can indicate whether the entry is a home phone, office phone, mobile phone, email address, instant messaging address, SMS address, or MMS address. With this structure, the tablet 602 can associate a specific icon to each field. The tablet 602 can be programmed in step 508 to present the selected image 704 with corresponding icons 806 in toolbar 804 of a user interface (UI) 802 such as shown in FIG. 8. The icons 806 can indicate the different communication devices available to the party ("Dad") which are associated with the image 704 by proximity. In the "Dad" illustration, the party has a mobile phone, a house phone, and an office phone each indicated by the icons 806.

The toolbar 804 also shows other previous associations made by the user or others utilizing the procedure discussed above. The toolbar 804 shows associations between images and contact book entries for "Mom", "Jon", and "Linda". Each image illustrates by way of icons the type of communication devices available to the user. For instance, "Mom" also has a mobile phone, a house phone, and an office phone, while "Jon" and "Linda" only have mobile phones and house phones. Note that since these images are more than likely familiar to users of the tablet 602, names are not shown in the toolbar 804 for each image. The tablet 602 however can be adapted to add name descriptors to the toolbar 804.

In step 510, the tablet 602 can be programmed to monitor an image selection by any user of the tablet. Since the tablet 602 has a touch-sensitive display, any user can select with an index finger an image or one of the icons on the toolbar 804. If a selection is detected, the tablet 602 proceeds to step 512 where it retrieves from an entry of the contact book (identified by the recorded pointer of step 504 for the selected image or icon) one or more communication identifiers. In step 514, the tablet 602 can determine if there is more than one communication identifier for the image. If there is only one communication identifier such as, for example, when the user selects the mobile phone icon for "Dad", the tablet 602 can proceed to step 516 where it invokes a communication session according the retrieved mobile phone number.

If there is more than one communication identifier such as when the user only selects the image for "Dad" and not an icon associated therewith, the tablet 602 can proceed to step 518 where it can be programmed to retrieve presence information associated with "Dad" from the presence system 130 previously described. In step 520 the presence information can indicate to the tablet 602 that Dad has his mobile phone active and is situated in the office. Therefore Dad can be contacted by way of his office phone or mobile phone. The tablet 602 can be programmed in step 522 to highlight the icons for the mobile phone and the office phone for image 704. The tablet 602 can highlight these icons with a colored rim, flash the icons, or use any other suitable means to notify the user of the communication devices that can be selected to contact the party. If the user selects one of the highlighted icons in step 524, the tablet 602 can proceed to step 516 and invoke the communication session according to the communication identifier retrieved from the contact book associated with the selected icon.

As a background process, the tablet 602 can also be programmed in step 526 to respond to incoming communication sessions. When an incoming communication session is detected, the tablet 602 can be programmed in step 528 to retrieve a communication identifier from the incoming session. The tablet 602 can identify in step 530 a match between the communication identifier retrieved in step 528 and an entry in the contact book. In this step, the tablet 602 can detect whether an image has been associated with the identified contact book entry, and can thereby identify the icon associated with the communication identifier detected in step 528. In step 532, the tablet 602 can highlight the image and/or the icon associated with the communication identifier of the incoming communication session along with asserting a common audile alert.

Suppose the caller is "Dad" from his mobile phone. In this case, the image 704 and the mobile phone icon 806 can be highlighted while the tablet 602 asserts an audible alert. If the image 704 is a video clip, the tablet 602 can be programmed to play the video during the audible alert. The user can visualize that the caller is "Dad" on his mobile phone from the highlighted image 704 and icon 806 and can answer the phone by selecting the answer button 808 or letting the call be redirected to a voicemail service.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that it is applicable to other communication services such as email communications, instant messaging, SMS messaging, MMS messaging, or other suitable forms of communications. Accordingly email icons, SMS icons and MMS icons can be added to an image. The icons can be selectable for invoking an outgoing communication. Similarly, these icons can be highlighted when incoming communications associated with emails, SMS messages or MMS messages are detected. Thus communications in general can be abstracted so that a user sees only images and icons, and not raw communication identifiers such as phone numbers, SIP URI addresses, email addresses, SMS addresses, and so on.

Additionally, the order and types of images and icons presented can differ in innumerable ways without departing from the scope of the present disclosure. Method 500 can also be applied to any communication device including without limitation a cordless handset, a mobile phone, a computer, a wireline phone, or any other suitable communication device of a present or next generation technology.

In another embodiment, method 500 can be adapted so that the tablet 602 monitors presence information as a background process for each party shown in the toolbar 804 independent of whether the tablet is in use by someone. As the presence information changes, the tablet 602 can be adapted to continuously highlight the communication devices which can be targeted to communicate with one of the parties shown in the toolbar 804. In this manner, a user can readily see at all time which communication device would be best suited to invoke a communication session. In yet another embodiment method 500 can be practiced without a presence system 130. In which case, a user selecting an image (and not a specific icon) can be queried as to which communication device to target to initiate a communication session. In another embodiment, method 500 can be adapted so that multiple images are created each with a unique icon (e.g., "Dad" with mobile phone, "Dad" with office phone, and so on).

Other suitable modifications can be applied to the present disclosure without departing from the scope of the claims below. Accordingly, the reader is directed to the claims section for a fuller understanding of the breadth and scope of the present disclosure.

Figure 9:
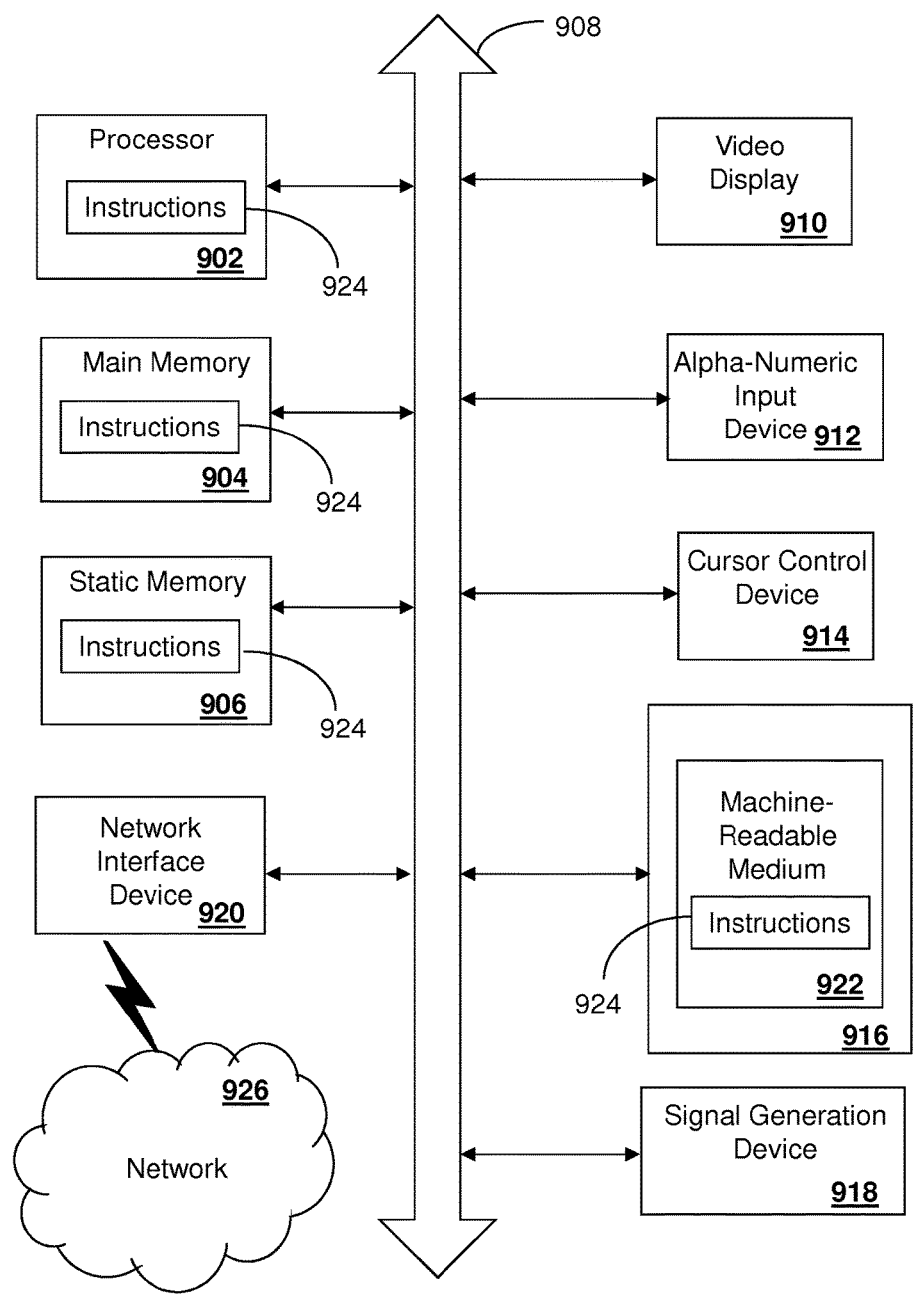
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A communication device, comprising:
a memory to store executable instructions; and a processor coupled to the memory, wherein responsive to executing the instructions, the processor performs operations comprising:

for each of a plurality of parties identified in a contact book:
monitoring presence information for the party, the presence information including a location of the party and at least one communication device associated with the party;
presenting an image associated with the party in a toolbar of a user interface;
presenting, adjacent to the image, a plurality of icons representing the communication devices associated with the party;
highlighting at least one of the icons according to the monitored presence information associated with the party; and
responsive to receiving a selection of one of the highlighted icons, initiating a communication session with the communication device of the party associated with the selected highlighted icon,
wherein the images associated with each of the plurality of parties are presented concurrently in the toolbar.

2. The communication device of claim 1, wherein the highlighted icon is highlighted according to the location of the party.

3. The communication device of claim 1, wherein the highlighted icon is highlighted according to activity of the communication device included in the presence information.

4. The communication device of claim 1, wherein the location of the party is determined from GPS coordinates received from a device associated with the party.

5. The communication device of claim 1, wherein the location of the party is determined from triangulation analysis performed from data provided by base stations in communication with a device associated with the party.

6. The communication device of claim 1, wherein the communication session comprises voice communication, email communication or messaging.

7. The communication device of claim 1, wherein the images comprise video content depicting the parties.

8. The communication device of claim 1, wherein the operations further comprise:
receiving an incoming communication session from one of the plurality of parties; and
highlighting the image associated with the party from which the incoming communication session is being received.

9. A computer program product stored on a non-transitory computer-readable storage medium, the computer program product including instructions configured to cause a processor to execute steps comprising:
for each of a plurality of parties identified in a contact book:
monitoring presence information for the party, the presence information including a location of the party and at least one communication device associated with the party;
presenting an image associated with the party in a toolbar of a user interface;
presenting, adjacent to the image, a plurality of icons representing the communication devices associated with the party;
highlighting at least one of the icons according to the monitored presence information associated with the party; and
responsive to receiving a selection of one of the highlighted icons, initiating a communication session with the communication device of the party associated with the selected highlighted icon,
wherein the images associated with each of the plurality of parties are presented concurrently in the toolbar.

10. The computer program product of claim 9, wherein the highlighted icon is highlighted according to the location of the party.

11. The computer program product of claim 9, wherein the highlighted icon is highlighted according to activity of the communication device included in the presence information.

12. The computer program product of claim 9, wherein the communication session comprises voice communication, email communication or messaging.

13. The computer program product of claim 9, wherein the images comprise video content depicting the parties.

14. The computer program product of claim 9, further comprising:
receiving an incoming communication session from one of the plurality of parties; and highlighting the image associated with the party from which the incoming communication session is being received.

15. The computer program product of claim 9, wherein the presence information includes a state of usage determined by polling the communication devices associated with each party.

16. A method comprising:
for each of a plurality of parties identified in a contact book:
monitoring presence information for the party, the presence information including a location of the party and at least one communication device associated with the party;
presenting an image associated with the party in a toolbar of a user interface;
presenting, adjacent to the image, a plurality of icons representing the communication devices associated with the party;
highlighting at least one of the icons according to the monitored presence information associated with the party; and
responsive to receiving a selection of one of the highlighted icons, initiating a communication session with the communication device of the party associated with the selected highlighted icon,
wherein the images associated with each of the plurality of parties are presented concurrently in the toolbar.

17. The method of claim 16, wherein the highlighted icon is highlighted according to the location of the party.

18. The method of claim 16, wherein the highlighted icon is highlighted according to activity of the communication device included in the presence information.

19. The method of claim 16, wherein the operations further comprise polling the communication devices associated with each party to determine a state of usage of the communication devices associated with the party.

* * * * *